United States Patent
Okano

(10) Patent No.: US 10,406,475 B2
(45) Date of Patent: Sep. 10, 2019

(54) GAS RECOVERY CONCENTRATION APPARATUS

(71) Applicant: SEIBU GIKEN CO., LTD., Fukuoka (JP)

(72) Inventor: Hiroshi Okano, Fukuoka (JP)

(73) Assignee: SEIBU GIKEN CO., LTD., Fukuoka (JP)

(*) Notice: Subject to any disclaimer, the term of this patent is extended or adjusted under 35 U.S.C. 154(b) by 140 days.

(21) Appl. No.: 15/729,106

(22) Filed: Oct. 10, 2017

(65) Prior Publication Data

US 2018/0099244 A1 Apr. 12, 2018

(30) Foreign Application Priority Data

Oct. 11, 2016 (JP) ................................. 2016-199665

(51) Int. Cl.
*B01D 53/06* (2006.01)
*B01D 53/50* (2006.01)

(52) U.S. Cl.
CPC ............ *B01D 53/06* (2013.01); *B01D 53/50* (2013.01); *B01D 2253/102* (2013.01);
(Continued)

(58) Field of Classification Search
CPC ............ B01D 53/06; B01D 2253/102; B01D 2253/108; B01D 2253/20;
(Continued)

(56) References Cited

U.S. PATENT DOCUMENTS 3,507,051 A * 4/1970 Calvert ................. B01D 53/04
34/340
3,619,130 A * 11/1971 Ventriglio ............. B01D 53/04
95/115

(Continued)

FOREIGN PATENT DOCUMENTS

| JP | 4-83509 | 3/1992 |
|---|---|---|
| JP | 6-91128 | 11/1994 |
| JP | 2000262847 A * | 9/2000 |
| JP | 2001-205045 | 7/2001 |
| JP | 2003-181242 | 7/2003 |
| JP | 2004-344703 | 12/2004 |

OTHER PUBLICATIONS

Matsukuma et al. "Study on Optimization of a $CO_2$ Recovery System from Flue Gas by Use of Honeycomb-Type Adsorbent" The Society of Chemical Engineers, Japan, 2007, pp. 218-226.

*Primary Examiner* — Frank M Lawrence, Jr.
(74) *Attorney, Agent, or Firm* — Staas & Halsey LLP

(57) ABSTRACT

A honeycomb rotor recovering and concentrating apparatus recovers a gas such as carbon dioxide from flue gases and the like and may be capable of utilizing low-temperature waste heat 100° C. or less. The proposed method involves sorbing carbon dioxide while vaporizing and cooling by contacting a water-insoluble carbon dioxide sorbing material (solid amines, etc.) having an acidic gas sorptive capacity with a mixed gas containing carbon dioxide in a wet state. Warm water is brought into contact with the water-insoluble carbon dioxide sorbing material sorbed with carbon dioxide to desorb high concentration of carbon dioxide. The warm water is separated from the water-insoluble carbon dioxide sorbent material desorbed from carbon dioxide. Then the apparatus is returned from the separation step to the sorption step. Thereby, it is possible to drastically increase the recovery rate and recovery concentration of acidic gas (carbon dioxide) continuously.

17 Claims, 9 Drawing Sheets

(52) U.S. Cl.
CPC .... *B01D 2253/108* (2013.01); *B01D 2253/20* (2013.01); *B01D 2253/202* (2013.01); *B01D 2253/25* (2013.01); *B01D 2253/3425* (2013.01); *B01D 2257/504* (2013.01); *B01D 2258/0283* (2013.01); *B01D 2259/40092* (2013.01); *Y02C 10/08* (2013.01)

(58) Field of Classification Search
CPC .......... B01D 2253/202; B01D 2253/25; B01D 2253/3425; B01D 2257/504; B01D 2258/0283; B01D 2259/40092; Y02C 10/08; F24F 3/1423
USPC .... 95/113–115, 128, 139, 148; 96/125, 143, 96/154; 423/230
See application file for complete search history.

(56) References Cited

U.S. PATENT DOCUMENTS

| | | | | |
|---|---|---|---|---|
| 4,122,150 | A * | 10/1978 | Hori ................. | C01B 17/775 423/244.01 |
| 5,494,869 | A * | 2/1996 | Hayden ............. | B01D 53/8612 423/230 |
| 2005/0217482 | A1* | 10/2005 | McAnespie ........... | B01D 53/06 95/113 |
| 2011/0189075 | A1* | 8/2011 | Wright .................. | B01D 53/62 423/437.1 |
| 2012/0000365 | A1* | 1/2012 | Okano .................. | B01D 53/06 96/144 |
| 2017/0136404 | A1* | 5/2017 | Okumura ............... | B01D 53/04 |

* cited by examiner

GAS RECOVERY CONCENTRATION APPARATUS

This application claims the benefit of Japanese Patent Application No. 2016-199665 filed Oct. 11, 2016, in the Japanese Patent Office, the disclosure of which is incorporated herein by reference.

BACKGROUND

The present invention relates to a thermal swing carbon dioxide recovery concentration apparatus which can recover by a high recovery rate, can condense to high concentration, and can miniaturize, has high endurance, can utilize waste heat 100° C. or less, and consumes less energy.

The effort to reduce carbon dioxide emitted from industry, cars, and homes as much as possible as a measure against global warming is being made on the world level. Specifically, it is such effort that old devices that consume energy are improved and replaced to produce energy saving effects. Also, to generate energy such as power generation, devices that utilize renewable energy such as sunlight and wind power are used. In addition, improvements are made to increase the power generation efficiency of the thermal power plants. Furthermore, the technologies for recovering and concentrating carbon dioxide discharged from thermal power plants and for storing it underground and in the deep sea have been also researched and developed for the future.

The technology for recovering and condensing carbon dioxide from the gas discharged from a thermal power plant, a combustion furnace, etc. is one focus of the present inventor.

The most popular thermal power plants use oil, natural gas and coal for fuel. In addition, there are some other thermal power plants which incinerate the garbage discharged from cities. In such thermal power plants, some which use coal as fuel have the following features. That is, coal is inexpensive as fuel, coal world reserves are much larger than oil and the reserves are located all over the world, therefore, it is easy to obtain and can supply electricity steadily.

However, coal has a problem that coal emits more carbon dioxide at the time of combustion as compared with oil or natural gas. Similarly, coal also emits much sulfide. Not only coal but heavy oil also has the same problem as coal. For this reason, in the plants which use coal or heavy crude oil as fuel, devices to remove SOx and nitrogen oxide have been provided, and environmental pollution is prevented.

However, even if SOx and nitrogen oxide are removed to prevent environmental pollution, carbon dioxide is still emitted so much that there is a problem of promoting global warming.

As a measure for improvement, research and development are being made on a technique of separating, recovering and concentrating carbon dioxide from exhaust gas, and storing the recovered carbon dioxide in the soil or the deep ocean. Various proposals such as a deep freeze method, an absorption method, an adsorption method, a membrane separation method, etc. have been proposed as means for separating, recovering and concentrating this carbon dioxide.

A deep freeze method is the method of pressurizing material gas to carry out liquefaction separation of the carbon dioxide under pressure by using the difference in the liquefaction temperatures of each gas. This method requires electric power for the compressor which compresses the gas and electric power for the freezer which carries out the deep freeze. For example, in a case where dioxide levels are just over or below 10%, the remaining 90% gases which do not need to be recovered, gases other than carbon dioxide, are necessarily also subjected to compression and deep freeze. Therefore, this method has such fault that energy expenditure becomes excessive.

The absorbing method is a method of desorbing carbon dioxide and condensing it by making an alkaline fluid of amine systems such as monoethanolamine absorb carbon dioxide, recovering and heating it. Although this method is already put in practical use, due to dealing with the alkaline fluid, an expensive corrosion-resistant material is needed. Therefore, the method is expensive. In addition, since the concentration of the amine aqueous solution is around 30% and water is around 70%, the heat capacity of the liquid to be handled becomes enormous. Even if a heat exchanger is placed in the necessary place and heat is recovered, the energy saving is approaching to its limit. (non-Patent document 2) Further, since monoethanolamine and the like are chemicals to be vaporized, there is a problem that secondary contamination is a concern if the gases are exhausted into the atmosphere.

The adsorption method uses a gas adsorption material such as zeolite or activated carbon, and the method can be a pressure swing method or a thermal swing method. The pressure swing method (hereinafter referred to as "PSA") adsorbs and desorbs using a pressure difference, and the thermal swing method adsorbs and desorbs using a temperature difference (hereinafter referred to as "TSA"). The PSA method uses the principle in which the amount of adsorption of carbon dioxide changes with pressure. Since, in the PSA method, carbon dioxide is separated and adsorbed by pressuring and carbon dioxide is desorbed and recovered by decompressing, a capacity-to-resist-pressure container is required as are precision instruments such as an electromagnetic valve, a compressor, and a vacuum pump, and there is such a problem that enlargement is difficult.

The TSA method absorbs carbon dioxide at a temperature below Centigrade 50° C. (let all temperature be "Centigrade" henceforth). At a temperature of around 100-200° C., carbon dioxide is desorbed to recover it. In a multi-tower system in which a plurality of adsorption towers packed with a carbon dioxide adsorbent are alternately switched between adsorption and regeneration, the pressure loss of gas is high, and fluctuations in concentration and pressure due to switching of the above-stated towers are inevitable. In addition, there are drawbacks such as difficulty in upsizing.

Also, in the TSA method, low-pressure power loss and/or enlargement of the device are addressed by using a rotating adsorption type honeycomb rotor as described in the Patent Documents 3 through 5. However, this method is insufficient with respect to the recovery rate of carbon dioxide, the concentration of carbon dioxide when concentrated, and the energy-saving nature of recovery energy.

RELATED ART DOCUMENTS

Patent documents 1: Japanese Patent Laid-open Publication Heisei 4-83509
Patent documents 2: Japanese Patent Laid-open Publication Heisei 6-91128
Patent documents 3: Japanese Patent Laid-open Publication 2001-205045
Patent documents 4: Japanese Patent Laid-open Publication 2003-181242
Patent documents 5: Japanese Patent Laid-open Publication 2004-344703

Non-Patent Literature 1: "Study on optimization method of CO2 removal and concentration system in combustion exhaust gas using honeycomb adsorbent" Chemical Engineering papers, the 33rd volume, pp. 218 to 229, 2007

SUMMARY

The inventor's proposals relate to a carbon dioxide recovery condensation method and apparatus thereof which can recover a carbon dioxide at a high recovery rate, can condense to high concentration, can miniaturize the apparatus. Also, its endurance is high, waste heat 100° C. or less can be used for reproduction. It needs little consumption energy. A more practical rotor type can also be realized in use of the principle of the inventor's proposals.

The Patent Documents 1 and 2 disclose rotors formed of a cylindrical shape-like container in which granular carbon dioxide adsorption material is separately accommodated in a plurality of bucket-like containers. By rotating the rotor or a duct device, the adsorption of carbon dioxide in an adsorption zone is carried out and the desorption and recovery of high-concentration carbon dioxide with heating gas in a desorption zone are carried out.

In this technology, the pressure loss of gas is high and energy-saving nature is not taken into consideration, either. The Patent document 2 discloses a method of using the heat from material gas as the heat source for the desorption of carbon dioxide. However, the energy-saving nature of the recovery concentration device itself is not taken into consideration.

A rotor having a honeycomb structure is proposed in the Patent Document 3, and a reduction of pressure loss is made. Using rotation, the rotor sequentially returns to an adsorption zone after moving through the adsorption zone, a desorption zone with heated carbon dioxide gas, a gas purge zone, and a regeneration cooling zone (herein after referred to as cooling zone). In the stage of passing through the desorption zone to move to the next zone, the high concentration carbon dioxide gas included in honeycomb openings is moved to the next zone with the rotation of the rotor. If the next zone is the cooling zone, high concentration gas is emitted into a coolant gas, and this reduces the carbon dioxide recovery rate. The purge zone is provided as a counter-measure.

Since the honeycomb is still hot even after passing the purge zone as the next zone after the desorption zone, its adsorption power for carbon dioxide is weak. If the material gas passes here, carbon dioxide gas will flow out without being adsorbed. The cooling zone is provided in front of the adsorption zone, so that the material gas moves to the adsorption zone after cooling the honeycombs. It is supposed that the recovery rate of carbon dioxide can be improved by this structure.

In the desorption zone, a circulation circuit is constituted by a gas heating coil and a desorption zone, and to increase the energy-saving nature, heat is recovered from a high temperature gas discharged from a boiler, etc. Also, in the cooling zone, a circulation circuit is constituted by a gas cooling coil and a cooling zone. That is, it is devised so that a chilling effect may be heightened. However, since the gas cooling coil and the cooling zone rely on a large amount of circulating gas, a more large-sized honeycomb rotor is required.

The Patent Document 4 discloses a proposal for optimization of the whole system which includes a boiler, a desulfurization apparatus, an eliminator, a honeycomb rotor dehumidifier apparatus, and a honeycomb rotor carbon dioxide recovery concentration device. However, as to the carbon dioxide recovery concentration device, the system has no significant differences from Patent Document 3.

The Patent Document 5 discloses that X type zeolite of the range of 2-2.5 of the $SiO_2/Al_2O_3$ ratio as a cation of Li, Mg, Na, Ca and Sr is used as the adsorption material of a carbon dioxide adsorption rotor. However, the carbon dioxide concentration apparatus otherwise has no significant differences over the Patent Document 3.

The carbon dioxide recovery concentration apparatus shown in FIG. 1 of the Non-Patent Literature 1 relates to the technologies shown in the Patent Documents 3-5. The carbon dioxide adsorption honeycomb rotor 1 is rotated at a speed of several to ten-odd revolutions per hour by a rotor drive motor 2 through a rotor drive belt (or chain) 3. With rotation of the rotor 1, it cycles back to an adsorption zone 4 after passing through the adsorption zone 4, a desorption zone 5, a gas purge zone 6 and a cooling zone 7. The circulation circuit for the cooling zone 7 is constructed by a gas cooling coil 8 and a coolant gas Blois 9. The circulation for the desorption zone 5 is constituted by a desorption gas heating coil 10 and a desorption gas circulation Blois 11.

The structures of the carbon dioxide recovery concentration system disclosed by the Patent Documents 3-5 and the Non-Patent Literature 1 are explained as follows. Since flue gas has high humidity and high temperature and contains contaminated gases such as sulfur oxides, nitrogen oxides and dust, pretreatment equipment such as a denitration device, a wet scrubber, a desulfurization device and a bag filter which are disclosed in the Patent Document 4 is provided to remove harmful gases and dust. Since the honeycomb rotor which is supported zeolite system adsorption material is used for carbon dioxide concentration, zeolite adsorbs vapor preferentially rather than carbon dioxide and carbon dioxide adsorption capability declines. Therefore, as the Patent Document 4 discloses, the flue gas is necessary to introduce after dehumidifying about dew point temperature from −20 to −60° C. as the pretreatment by a honeycomb rotor dehumidifier.

Operation of the related art of the above structure is explained as follows. Material gas which is generated by pretreatment of flue gas is introduced into the adsorption zone 4, a honeycomb adsorbs carbon dioxide from the material gas, concentration decreases, and the material gas merges with the exit air of cooling zone 7 to mix.

The merged gas is cooled by passing through a gas cooling coil 8 in a coolant gas circulation blower 9 and is introduced into the cooling zone 7. In the cooling zone 7, since the honeycomb has rotated from desorption zone 5 to purge zone 6 and has a high temperature, the honeycomb has not recovered its carbon dioxide adsorption capability. For recovering the capability, the honeycomb is cooled in the cooling zone 7.

Even in cooling zone 7, adsorption of carbon dioxide advances. As for the gas circulating in the cooling zone 7, a surplus of gas from which the recovered carbon dioxide is removed from the material gas after introduction to the adsorption zone 4 is discharged to the outside of the system and exhausted to the atmosphere.

In the desorption gas circulation circuit, high concentration carbon dioxide gas is heated to 140-220° C. by a desorption gas heating coil 10 introduced into the desorption zone 5. Then, the heated carbon dioxide gas heats the honeycomb to desorb the carbon dioxide absorbed on the honeycomb. That is, the gas which comes out of the desorption zone 5 returns to a desorption gas heating coil 10 again using a desorption gas circulation blower 11 to circulate it. The amount of gas in the circulation circuit increases using the desorbed carbon dioxide gas, and part of the gas accounting for the increased amount is taken out and recovered outside the circulation circuit. As to this method, since the carbon dioxide gas is desorbed using heated carbon dioxide gas, it is difficult to desorb the carbon dioxide gas completely, and this also causes rotor enlargement.

In a honeycomb rotor dehumidifier or a honeycomb rotor organic-solvent concentration device, the heated air is introduced into a desorption zone, and the vapor which is adsorbed on the honeycomb or VOC is mixed with air as the carrier gas to cause desorption. However, if the carrier gas is used in a carbon dioxide concentration device, carbon dioxide recovery levels will be reduced. Therefore, high concentration carbon dioxide gas is used for desorption. That is, a completely different view from a honeycomb rotor dehumidifier or a honeycomb rotor organic-solvent concentration device is needed.

In a purge zone 6, the high concentration carbon dioxide gas included in the opening of the honeycomb which has rotated to move from desorption zone 5 is purged to return to the desorption zone 5. Thereby, the spill of the recovered carbon dioxide is prevented. As purge gas, a part of coolant gas is used. However, flue gas can be used as the purge gas. By this gas purge, there is an effect which improves a carbon dioxide recovery rate.

If the amount of purge gas is further increased, desorption of the adventitious qualities is promoted in the gas purge zone 6 by using preheating. Further, by recovering the heat in the purge zone and reusing in the desorption zone 5, energy saving effect is obtained. As to the rotor type dehumidifier and the rotor type organic-solvent concentration device, this flow is used fluently. However, in the case of the proposed carbon dioxide concentration apparatus, since a gas having a low carbon dioxide concentration is introduced into the desorption circuit to reduce the carbon dioxide recovery concentration, it is not possible to increase the amount of the purge gas to increase the energy saving effect.

As another problem, in order for cooling of the honeycomb immediately after reproduction and for removing the heat of adsorption which is generated by adsorption of carbon dioxide at the time of cooling zone passage, circulation coolant gas 4 to 6 times the amount of processing gas must be flowed. Therefore, since the amount of cold water supplied to a syngas cooler and the power consumption of a circulation blower are large, the rotor is enlarged.

Also, since the desorption gas has to be circulated by about twice as much as the material gas amount, as shown in Table 1, compared with the rotor diameter of the honeycomb rotor organic solvent concentrator, the same treatment (material) gas amount, a large rotor with a volume greater than 5 times and a rotor diameter greater than 2.2 times is required as a problem.

TABLE 1

Comparison of Rotor diameter to Treatment flow rates
(Unit of flow: Nm³/h)

|  | dehumidifier | VOC concentrator | conventional CO2 concentrator |
|---|---|---|---|
| zone ratio | 1:1:3 | 1:1:10 | 5:2.5:1 |
| processing zone flow | 70,000 | 70,000 | 70,000 |
| regeneration zone flow | 23,300 | 7,000 | 170,000 |
| purge zone flow | 23,300 | 7,000 |  |
| cooling zone flow |  |  | 330,000 |

TABLE 1-continued

Comparison of Rotor diameter to Treatment flow rates
(Unit of flow: Nm³/h)

|  | dehumidifier | VOC concentrator | conventional CO2 concentrator |
|---|---|---|---|
| total gas flow | 116,600 | 84,000 | 570,000 |
| rotor diameter conversion | 4.54 m | 3.85 m | 10.0 m |

As described above, there are problems associated with a carbon dioxide recovery and concentrating apparatus, including the need for simultaneously improving the related art concentration and recovery rate, downsizing the rotor, and drastically lowering energy consumption. As described above, there is a big problem associated with how to effectively cool the honeycomb in order to reduce the size of the rotor and enhance the performance of the carbon dioxide recovery and concentration apparatus. Even in the organic-solvent concentration device of a honeycomb rotor type and a dehumidifier, it is common sense that performance improvement can be carried out by providing a purge zone and pre-cooling the honeycombs. However, it is necessary to consider as a separate item, the heat that must be removed by cooling.

The first problem relates to of adsorption capacity. Since high-concentration gas different from the organic solvent or vapor is necessary to be adsorbed, the adsorption material in the adsorption zone must accommodate a processing gas volume from several times to about ten times that of an organic-solvent concentration device or a dehumidifier. In other words, a rotor having a volume several times to several tens of times larger than that of the conventional apparatus is required for the material gas amount.

In order to solve this problem, it is conceivable to increase the rotational speed of the rotor to cope with the adsorption processing amount. However, in order to remove the heat storage of the honeycomb after desorption, the purge cooling effect by the material gas is quite insufficient. Therefore, it is necessary to provide a cooling zone which is several times wider than the adsorption zone and to cool it by circulating several times the amount cooling gas as that of the adsorption gas.

The second problem relates to the heat of adsorption of carbon dioxide. If carbon dioxide is adsorbed from the gas which passes through the honeycomb rotor, heat is generated by adsorption and the adsorption power of the adsorption material declines because of the temperature of the gas and the temperature of the honeycomb increase by the heat of adsorption. The heat of adsorption of carbon dioxide is from about 1/6 to 1/7 of the heat of adsorption of vapor. However, in order to have to adsorb high-concentration carbon dioxide far as compared with an organic-solvent concentration device or a honeycomb rotor dehumidifier, much heat of adsorption generates. As to a dehumidifier of honeycomb rotor type, in the case of high humidity, it can respond in such two steps that a dehumidifier of cooling type pre-dehumidifies in the preceding stage and a honeycomb rotor dehumidifier dehumidifies. However, such a method is impossible for carbon dioxide concentration.

Therefore, even if it fully cools in a cooling zone, carbon dioxide adsorption in an adsorption zone becomes insufficient, and the recovery rate and the $CO_2$ concentrate concentration do not go up. For the two above reasons, in order to remove thermal storage and the heat of adsorption, a comparatively large cooling zone is provided and circulation cooling is carried out. However, there are problems that the energy for cooling is increased, the diameter of the rotor must be increased, and the apparatus must become excessive.

Analysis of the test results and simulation results of Non-Patent Literature 1 reveals that the carbon dioxide recovery energy of the honeycomb rotor carbon dioxide recovery and concentration device is about 15 times that of the carbon dioxide vaporization latent heat of 369.9 kJ/kg, which is considered as a measure of the carbon dioxide desorption energy, and about 80 to 90% of the thermal energy input to the desorption zone is thought to have been introduced only to warm the honeycomb (the binder fixing the honeycomb substrate, the adsorbent and the adsorbent). In the cooling zone, there is a vicious cycle that the energy consumption further increases in order to remove the huge amount of heat storage caused prior to this zone.

In the absorption method, an amine aqueous solution having an amine concentration of about 30% is brought into contact with a material gas to absorb carbon dioxide in the aqueous amine solution. About 70% of the amine solution is water, and the density of water is about 800 times (1.251:1000 kg/m 3) as the main component of the material gas. The specific heat of water is about 4 times (4.187:1.038 kJ/kg·k) that of the material gas. Therefore, the heat capacity per volume of water is about 3,200 times that of the material gas, and the heat capacity is very large. Also, since the heat of absorption of carbon dioxide is absorbed by water having a large specific heat, the temperature rise of the amine solution is small. Therefore, since the influence that the absorption amount of carbon dioxide decreases due to the rise in the temperature of the material gas and the amine aqueous solution as the absorption liquid is small, by bringing the material gas into contact with the absorption liquid only once, most of carbon dioxide in the material gas can be absorbed. This is an advantage of the absorption method. However, on the contrary, since the heat capacity of the absorption liquid is enormous, it has the disadvantage that the energy loss due to heating and cooling of the absorption liquid also increases.

Against this backdrop, the present inventor proposes a new method and apparatus for removing carbon dioxide. The proposal relates to a technology for recovering and concentrating carbon dioxide gas using a solid and water insoluble amine carbon dioxide sorbent. In addition, with the inventor's proposals, the material gas is brought into contact with the sorption material, and carbon dioxide in the material gas is sorbed and concentrated. In the desorption of carbon dioxide after sorption/concentration, the solid sorbent material is brought into direct contact with warm water to heat the sorbent material and desorb carbon dioxide and recover it. The sorption material from which carbon dioxide gas has been desorbed returns to the sorption process again to recover and concentrate carbon dioxide gas with high efficiency. The sorption material returns to the sorption process while its surface is wet. Cooling of the sorption material is accelerated by the evaporation cooling phenomenon of water, and the sorption heat of carbon dioxide gas is removed by cooling. As a result, the device has an advantage that carbon dioxide gas can be efficiently sorbed. As the solid, water-insoluble amine carbon dioxide sorbent, in addition to a basic ion exchange resin having an amine group, it is also possible to use a sorbent in which the surface of the adsorbent is rendered water repellent so that water does not flood inside by carrying an amine carbon dioxide absorbent or an ionic liquid or the like in the pores. Although the sorption phenomenon and the absorption phenomenon are different from each other, they are phenomena similar to each other, and in the case where there are both elements, sorption is sometimes used. Also, the ion exchange resin has pores filled with water due to water content. If it is thought that carbon dioxide sorbs to the amine group on the pore surface by diffusing in the pores, it is appropriate to adopt sorption phenomenon. In addition, since a material having an amine solution, an ionic liquid or the like in the pores of the porous solid sorbent material is a sorption material, it is described as a sorption material in the description. However, even if it is any, it does not change that it is the main point of the inventor's proposal that it is a solid and in non-watersoluble.

As an operation form, the inventor's proposal can be used with a multiple bed type machine, a rotating rotor type machine, and a fluid phase style machine. A rotating rotor type machine has a merit that enlargement is easy is explained. A honeycomb made with an inorganic fiber sheet, a metal sheet or a plastic sheet is provided to form a rotor which carries a non-water soluble solid amine such as an ion-exchange resin which has an amine group. As shown in FIG. 2, the operation form has a structure that the rotor returns to sorption zone 13 again after rotating through the sorption zone 13 which introduces material gas, and a carbon dioxide desorption zone 14 that uses warm water. This is done by rotating along a rotating direction of the rotor.

The material gas is introduced into the sorption zone 13 to sorb carbon dioxide gas, then the rotor rotates, the honeycomb moves to the desorption zone, and furthermore, warm water is introduced and heated to desorb carbon dioxide. Next, the honeycomb rotates from the desorption zone 14 to the sorption zone, and in the sorption zone 13, the warm water that has flowed into the honeycomb flow channels is drained, the material gas is again introduced, and sorption of carbon dioxide is started.

When the material gas containing carbon dioxide is introduced into the sorption zone to sorb carbon dioxide by the honeycombs, since the honeycombs got wet in water for the reason stated later, the honeycombs are powerfully cooled by the evaporative cooling phenomenon by passing the material gas, and its sorption capability is promoted.

The honeycombs which sorbed carbon dioxide move to the desorption zone by rotation of the rotor, warm water is introduced in the desorption zone, the material gas in the honeycomb openings is substituted by the warm water to be drained, and the honeycomb is directly heated by the warm water. The carbon dioxide desorbed by heating is recovered as gas or the carbon dioxide dissolved in water is recovered at a warm water heater part.

When moving to the desorption zone, the material gas which filled the honeycomb openings in the sorption zone is replaced by warm water, then the replaced material gas is exhausted to a material gas flow channel. Therefore, the material gas does not mix with the recovered carbon dioxide gas to reduce the recovery concentration of carbon dioxide gas. As a result, high-concentration carbon dioxide gas is recoverable. In the desorption zone, warm water flows in the honeycombs and comes into direct contact with the solid amine contained in the honeycomb, to heat efficiently. Since the density of water is about 500 times (1.977:1000 kg/m3) that of carbon dioxide and since the specific heat of water is about 5 times (4.187:0.817 kJ/kg-k) that of gas, the calorific capacity per volume increases about 2500 times. Therefore, it is not necessary to make the carbon dioxide gas circulate with the carbon dioxide gas re-heated repeatedly in order to make carbon dioxide gas desorb as indicated in FIG. 3. Since the amount of warm water introduced only needs to be several times as large as the honeycomb openings, the desorption zone can be made small and the power loss for circulating the desorption gas is reduced.

When the honeycomb moves to the sorption zone from the desorption zone by rotation of a rotor, the warm water which filled the inside of the honeycomb is drained, and returned to a warm water heater. The drainage water is re-heated, and the warm water is circulated.

In the desorption zone, as the temperature of the warm water decreases, the dissolved amount of carbon dioxide increases and a part thereof dissolves in warm water. For example, when the temperature of warm water drops to 40° C., the amount of carbon dioxide gas dissolved in water is about 0.6 volumes with respect to 1 volume of water. The low temperature warm water in which carbon dioxide is dissolved returns to the warm water heater as shown in FIG. 6 to be reheated again, and the water is introduced into the desorption zone again. However, since the solubility of carbon dioxide gas decreases by heating, carbon dioxide gas is desorbed from the warm water and recovered. For example, since the amount of carbon dioxide to be dissolved in warm water at 80° C. becomes 0.2 volumes or less, the difference of 0.4 volumes can be recovered in this process.

The honeycomb immediately after moving to the sorption zone has got warm and wet with warm water. However, if material gas flows, it will be powerfully cooled by the evaporative cooling phenomenon of water, and sorption of carbon dioxide gas will start. In order to use the evaporative cooling effect of material gas effectively, it is desirable to carry out cooling dehumidification of the material gas perhaps to approximate open air temperature and humidity. However, it is not necessary to dehumidify to a low dew point (below 10-20° C. D.P.) as in the case of using synthetic zeolite. Therefore, the pretreatment system of material gas may be simple and an initial cost and a running cost are also lowered.

According to the methods of Patent Documents 3 to 5 and the Non-Patent Literature 1, adsorption heat is generated by adsorption of carbon dioxide, the temperature of the gas and the honeycomb becomes high and the adsorption amount decreases. However, according to the proposed method, as long as the honeycomb is wet with water, the vaporization cooling phenomenon by the material gas continues so that the heat of sorption is converted into the heat of vaporization for effective cooling to maintain high sorption performance. By the way, because the latent heat of vaporization of water is 2500 kJ/kg for vaporization latent heat 369.9 kJ/kg to sublimation latent heat 573 kJ/kg considered as a measure of heat sorption of carbon dioxide, calculation is possible to remove sorption heat of about 4 to 5 kg of carbon dioxide by evaporation of 1 kg of water contained in the honeycomb.

In FIG. 1, since the adsorption amount per pass decreases due to the temperature rise due to adsorption heat, it is necessary to pass the process gas 4 to 7 times while re-cooling the process gas. However, according to the method proposed by the inventor, since sorption heat is strongly removed by the vaporization cooling phenomenon of water, most carbon dioxide can be sorbed in a single pass, and the size of the sorption zone is less than a quarter of that in Non-Patent Literature 1. Therefore, the rotor size can be drastically reduced. As a result, according to the inventor's proposals, the power cost and the initial cost of the processing gas circulation blower can be remarkably reduced.

Further, durability is improved as a long term operation effect. Solid amine carbon dioxide sorbent materials can withstand up to 100° C. because of low oxygen in water. However, the sorption material is remarkably deteriorated even in a temperature range of 40 to 50° C. in a gas containing oxygen. In the method proposed by the inventor, the temperature of the amine sorbent at the time of sorption is suppressed to 40° C. or less. Also, since the sorbent is in warm water at the time of desorption, oxygen is small. Therefore, deterioration is prevented and durability is improved.

Also, some material gases include contaminated gases such as SOx and nitrogen oxides that could not be removed by pretreatment. Therefore, in the liquid amine method, expensive amine solution deteriorated by contaminated gas must be updated annually. In the proposed method, since desorption is carried out with warm water, contaminated gases dissolve in warm water and the deterioration of the solid amine sorbent material is alleviated. In addition, pollutants can be removed periodically by replacing the warm water with purified water. Also, since it is also possible to wash with purified water, wash with pure water, and/or wash and regenerate with an alkaline regenerant, if necessary, the present method has the effect of increasing the service life of the honeycomb rotor.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3-*b* shows a cross sectional view taken along the A-A section of FIG. 3-*a*.

FIG. 3-*c* shows a cross sectional view taken along the B-B section of FIG. 3-*a*.

DETAILED DESCRIPTION OF THE PREFERRED EMBODIMENTS

Figure 1:
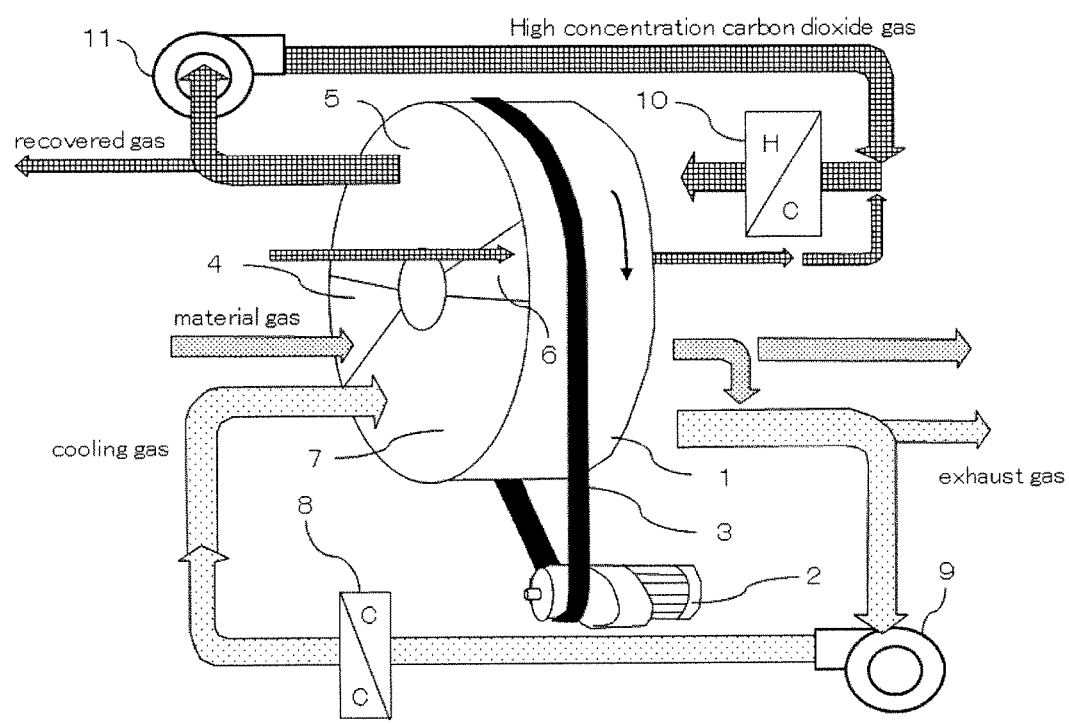
FIG. 1 shows a flow diagram of the carbon dioxide recovery concentration apparatus described in the Non-Patent Literature 1.

Reference will now be made in detail to the preferred embodiments of the present invention, examples of which are illustrated in the accompanying drawings, wherein like reference numerals refer to like elements throughout.

The case where the inventor's proposals are applied to a rotor-type rotary carbon dioxide recovery and concentration apparatus which is easy to enlarge is explained. Also, a honeycomb rotor type apparatus with low pressure loss and easy handling will be explained. The proposed apparatus includes a honeycomb made of an inorganic fiber sheet, a metal sheet, a plastic sheet. The rotor carries an ion exchange resin having an amine group, a water-insoluble solid amine and the like, and is configured to return to a sorption zone again after rotating through the sorption zone and a desorption zone for carbon dioxide using warm water.

Since the flue gas has a high temperature, high humidity and contains contaminated gases such as sulfur oxides, nitrogen oxides, dust and the like, harmful gas and dust are removed by providing a pretreatment device such as a denitration device, a wet scrubber, a desulfurization device, a bag filter, etc., which is disclosed in the Patent Document 4.

After the processing, the material gas containing carbon dioxide is passed in the sorption zone and carbon dioxide is made to sorb by the honeycomb. The honeycomb which has sorbed carbon dioxide moves to the desorption zone by rotation of the rotor, warm water is introduced, and a honeycomb recovers the carbon dioxide gas which is heated directly and desorbed with warm water. Next, the honeycomb rotor rotates to the sorption zone again from the desorption zone. The warm water which was flowing into the honeycomb channel is drained in the sorption zone. The material gas flows again, and sorption of carbon dioxide gas starts.

In the adsorption method, there is a disadvantage that it requires a lot of energy to desorb the adsorbed water vapor, since, for example, any one of synthetic zeolite, activated carbon and the like have excellent dry carbon dioxide adsorptivity. However, the adsorption rate for carbon dioxide decreases a little or greatly by preferentially adsorbing the water vapor from the treatment gas. The vapor adsorbed must be desorbed on the desorption side. In addition, it is necessary to provide a dedicated process for desorbing the vapor adsorbed and stored periodically.

On the other hand, an advantage of the proposed method is that the sorbent material is wet with warm water immediately after switching from desorption to sorption. However, since the moisture evaporates by passage of the gas to be processed, the moisture cools and removes heat stored in the honeycomb. In addition, in another advantage of the method, the moisture contributes to removing the sorption heat of carbon dioxide. Therefore, water in the honeycomb is not a problem, but rather a positive advantage.

In the case of using a honeycomb rotor carrying a zeolitic adsorbent for concentration of carbon dioxide, since water vapor is preferentially adsorbed by zeolite rather than carbon dioxide and the ability to adsorb carbon dioxide is lowered, as disclosed in the Patent Document 4, it is necessary to dehumidify to a dew point temperature to about −20 to −60° C. by pretreatment with a honeycomb rotor dehumidifier. However, this is not necessary according to the inventor's proposals. Also, in order to utilize the evaporative cooling effect described above for the sorption zone, it is better to cool down and dehumidify the material gas to a certain extent. However, negative dew point temperature dehumidification is unnecessary.

Figure 7:
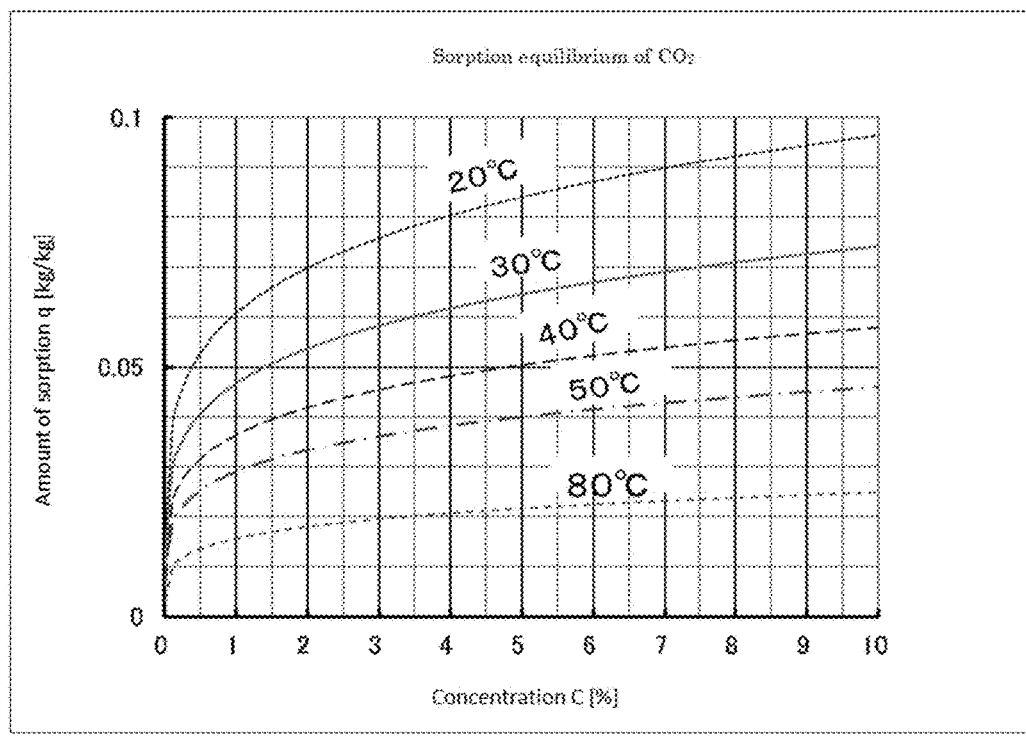
FIG. 7 shows an isothermal curve of carbon dioxide sorption with a solid amine sorbent.

In order to carry out cooling dehumidification of the gas to be processed, cold heat apparatus is required, and thereby increases energy expenditure. However, if the sorption gas temperature is lowered, the sorptive capacity of the solid amine can dramatically increase as shown in FIG. 7. Although it is actually impossible to double the sorption capacity of sorption material, it is possible to double the substantial sorption capacity by decreasing the temperature of the gas to be processed and the evaporative cooling effect. As explained above, by cooling the material gas, the carbon dioxide recovery and concentrating apparatus can be greatly improved in performance and size. As a result, the entire system can be downsized, and energy savings can be achieved.

In power plants and waste incineration plants, energy saving is aimed at recovering and recycling waste heat as much as possible. However, low temperature waste heat such as warm water is limited in its usability. The method of doubling the capacity of the entire system by utilizing this low-temperature waste heat has superiority in terms of overall energy saving. For cooling and dehumidifying the treated air, it is possible to utilize excessive low-temperature waste heat by using absorption chillers and adsorption refrigerators. These refrigerators can utilize such low-temperature waste heat that cannot be used for a desorption of amine type or TSA type method. Thereby, the proposals can reduce the cost of recovering and concentrating carbon dioxide.

Figure 2:
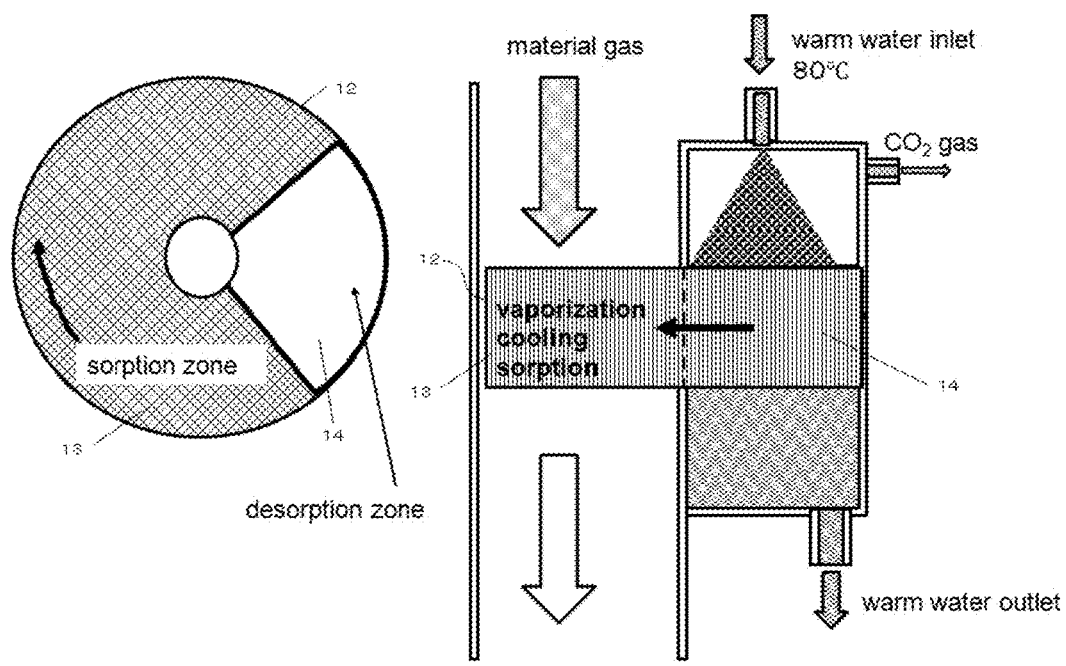
FIG. 2 shows a flow diagram of a first embodiment of the proposed carbon dioxide recovery concentration apparatus.

FIG. 2 shows a first Preferred Embodiment of the inventor's proposals. The honeycomb rotor 12 is constructed as follows. Porous paper including plastic fibers such as PET fiber mainly composed of inorganic fibers such as glass fibers is corrugated and the corrugated paper is wound to form a rotor. Then, the wound paper is dispersed in a solid amine fine powder and a heat and water resistant binder. According to such processes, a honeycomb rotor 12 carrying a solid amine fine powder can be obtained. In the proposed method, since warm water is used for desorption of sorbed carbon dioxide, a calcination step for improving incombustibility and heat resistance of the honeycomb rotor 12 is unnecessary. On the contrary, since pulp fiber deteriorates due to warm water, it is not used. Inorganic fibers such as glass fibers and synthetic fibers such as PET are sometimes blended together in order to maintain and secure strength in warm water. If nonwoven fabric of synthetic fiber having warm water resistance, shape retention and strength, etc., is used, interposition of inorganic fibers is not absolutely required.

The carbon dioxide recovery concentration apparatus with the above-explained rotor 12 has sorption zone 13 and desorption zone 14. The honeycomb rotor 12 is constituted so that it returns to the sorption zone 13 again after rotating from the sorption zone 13 through desorption zone 14.

Carbon dioxide is sorbed in the granular solid amine layer carried on the honeycomb when the material gas which is generated by processing of denitration, desulfurization and dust removal is introduced into the sorption zone 13.

When carbon dioxide sorbs, a heat of sorption is generated, and the carbon dioxide sorption ability is hindered by an increase in the gas temperature. However, since the proposed carbon dioxide sorbed honeycomb of the rotor 12 is moistened with water for a reason to be described later, water is evaporated by passage of the material gas. As a result, a temperature rise can be suppressed by causing a vaporization cooling phenomenon. Therefore, the sorption performance is dramatically improved.

Since the latent heat of evaporation of water is 2500 kJ/kg·K and latent heat of 6 times or more the latent heat of vaporization of carbon dioxide 369.9 kJ/kg·K, the heat of sorption is changed to the latent heat of evaporation of water, and heat can be effectively removed. In the technique of FIG. 1 of Non-Patent Literature 1, unless the material gas is circulated many times in the treatment zone 4 and the cooling zone 7, it is impossible to improve the recovery rate of carbon dioxide. However, with the inventor's proposals, it is possible to achieve a sufficient recovery rate with one to several cycles. Therefore, it is possible to reduce the apparatus size and power consumption of the blower, and attain energy savings.

The honeycomb which sorbed carbon dioxide moves to desorption zone 14 by rotation of the rotor. Warm water is introduced in the honeycomb in desorption zone 14. The honeycomb is heated with the warm water. The solid amine of the honeycomb desorbs carbon dioxide. This is carbon dioxide is released as a gas or dissolved in water for recovery. Since the honeycombs returns to sorption zone 13 again after desorption, the proposed device can carry out recovery concentration of carbon dioxide gas continuously.

Figure 6:
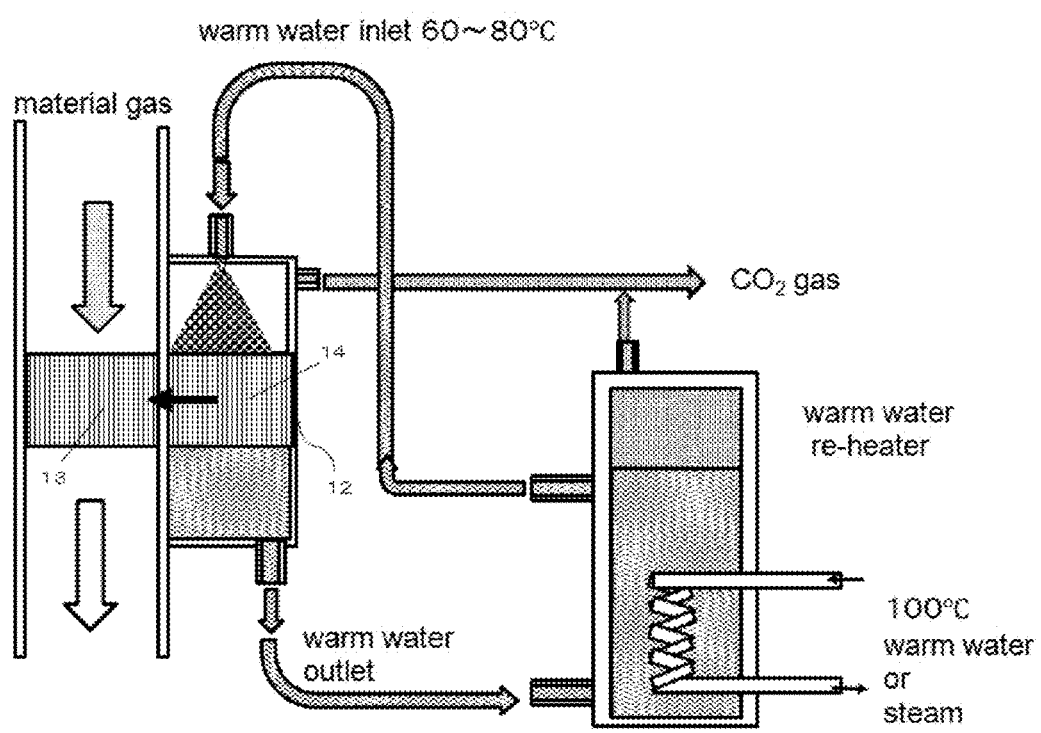
FIG. 6 shows a diagram of the first preferred embodiment of the proposed carbon dioxide recovery concentration apparatus.

As the warm water flowing into the honeycomb heats the honeycomb, the carbon dioxide gas is desorbed. However, as the temperature of the warm water decreases, the dissolved amount of carbon dioxide in the warm water increases and the carbon dioxide partly dissolves. For example, when the temperature of warm water falls to 40° C., the amount of carbon dioxide gas dissolved in water is about 0.6 volume with respect to 1 volume of water. As shown in FIG. 6, the low temperature warm water in which carbon dioxide is dissolved is returned to a warm water re-heater, reheated, and introduced again into the desorption zone 14. However, carbon dioxide gas whose solubility has been lowered by heating is desorbed from warm water and recovered. For example, since the amount of carbon dioxide dissolved in warm water at 80° C. becomes 0.2 volume or less, the difference of 0.4 volume can be recovered in this process.

Figure 3A:
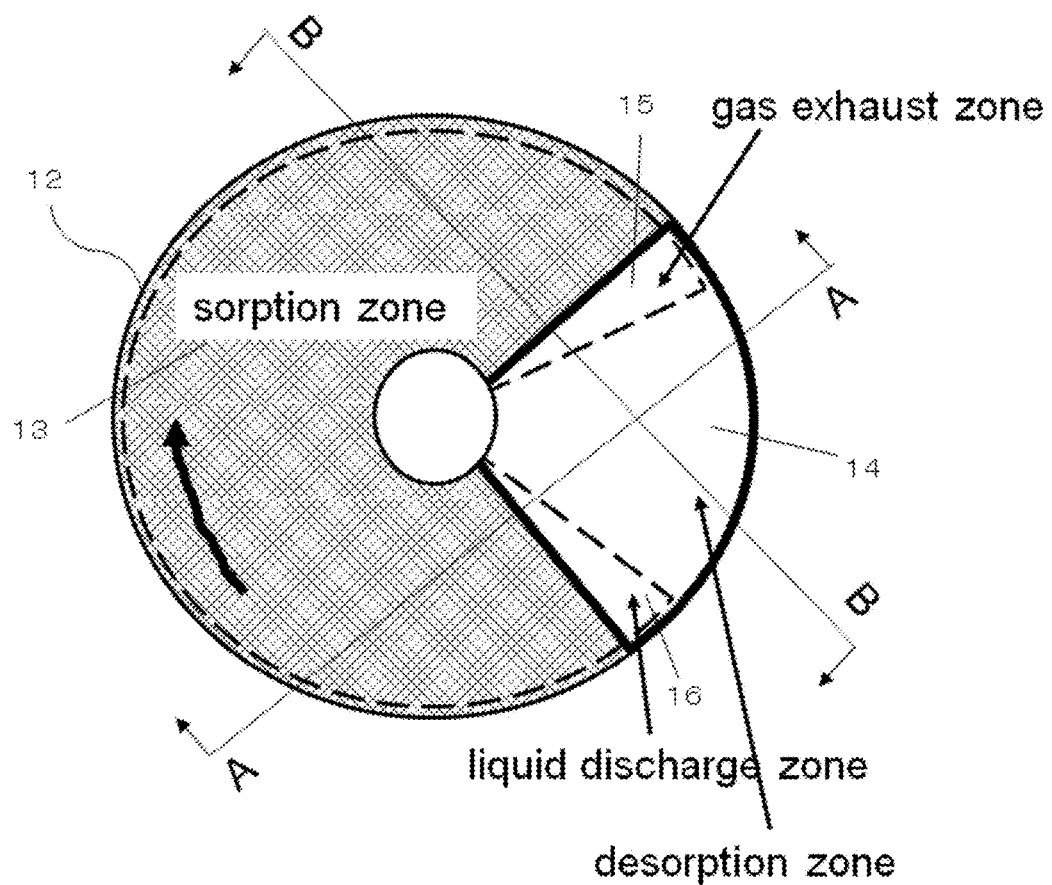
FIG. 3-*a* shows a flow diagram of a second preferred embodiment of the proposed carbon dioxide recovery concentration apparatus.
Figure 3B:
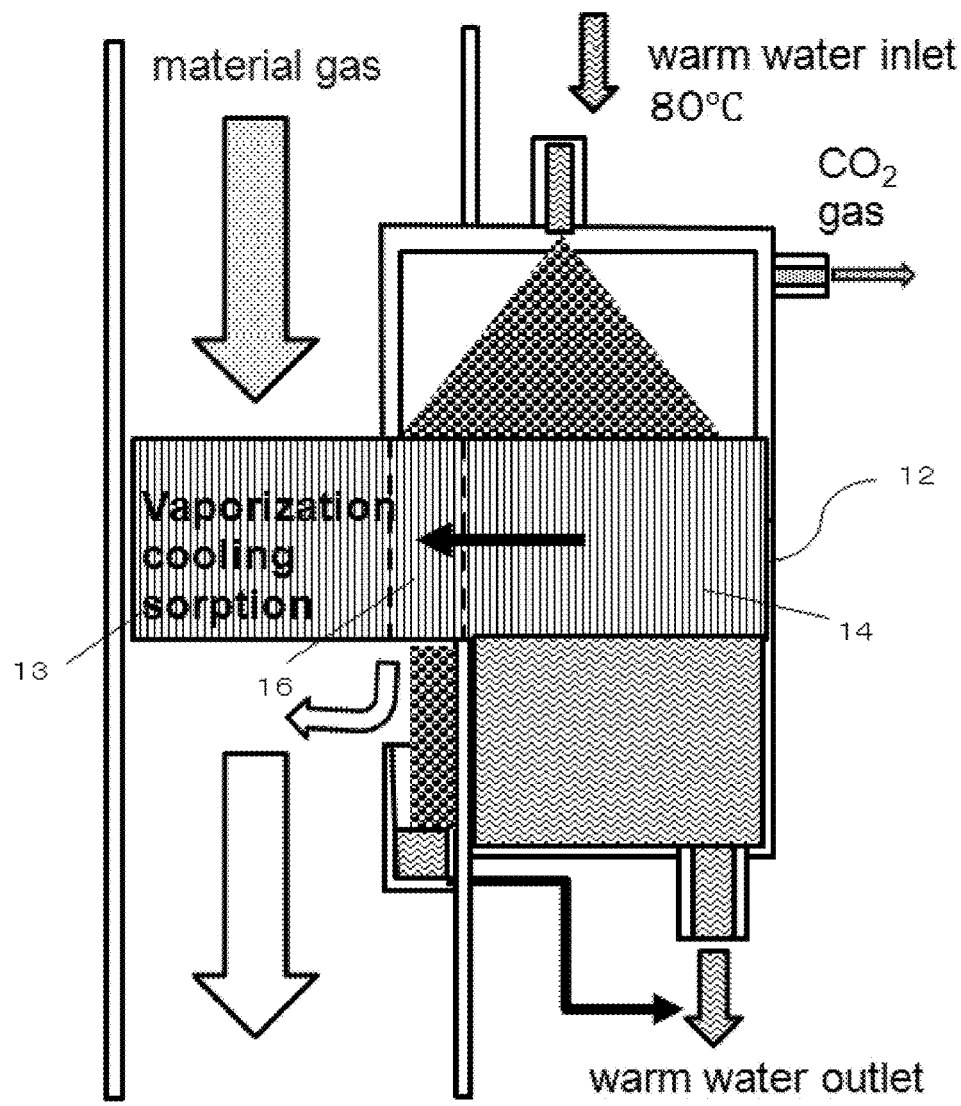
Figure 3C:
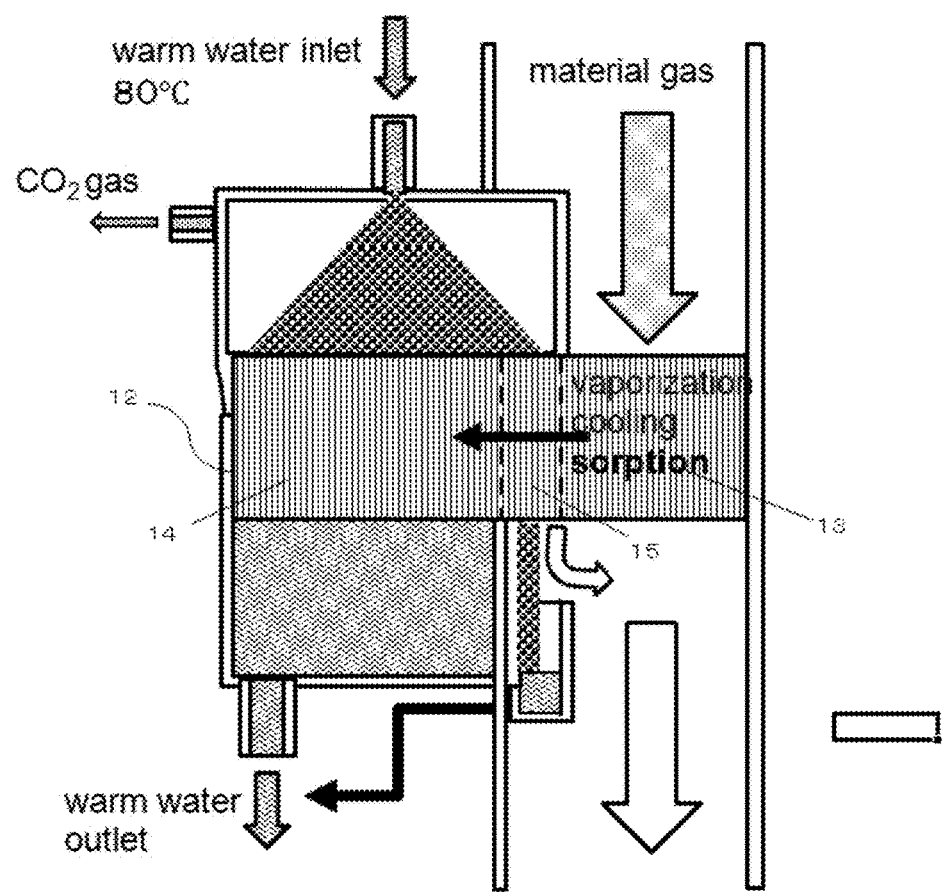

A second preferred embodiment of the inventor's proposals is shown in FIGS. 3 a, 3 b, and 3 c. FIG. 3-b is a cross sectional view taken along the line A-A of FIG. 3-a, and FIG. 3-c is taken along the line B-B of FIG. 3-a. A heat resistant and water resistant adhesive is coated on the front and back of a sheet material such as a metal foil or a synthetic resin sheet. 0.1 to 1 mm of granular solid amine which does not dissolve in water is distributed and adhered on the sheet. The sheet is processed to be corrugated, further, to be wrapped or laminated, thereby, obtaining a carbon dioxide-concentration honeycomb rotor 12.

The sheet on which the granular solid amine is distributively adhered can be produced by a method such as, for example, that described in Japanese Examined Patent Publication No. 7-16576. However, it is not limited to this method.

The carbon dioxide recovery concentration apparatus returns to sorption zone 13 again after rotating through the sorption zone 13, gas discharge zone 15, desorption zone 14 and liquid discharge zone 16 along with the direction of rotation of the honeycomb rotor 12. If a material gas containing the carbon dioxide gas, which is generated by pretreating an exhaust gas discharged from a plant etc., is introduced into the sorption zone 13, carbon dioxide is sorbed in the granular solid amine layer adhered to the honeycomb.

Sorption heat is generated when carbon dioxide sorbs, and the gas temperature rises, which hinders carbon dioxide sorption ability. However, since the carbon dioxide sorption honeycomb of the rotor 12 is wet with water for the same reason as in the embodiment 1, water evaporates due to the passage of the material gas to cause vaporization cooling phenomenon and suppress a temperature increase. Therefore, sorption performance is improved.

The latent heat of evaporation of water is 2,500 kJ/kg·K, which is more than 6 times the latent heat of vaporization of carbon dioxide of 369.9 kJ/kg·K. Therefore, sorption heat can be effectively removed by converting it into latent heat of evaporation of water. According to non-patent literature 1, unless the material gas is circulated many times while cooling the material gas in the treatment zone, the recovery rate of carbon dioxide cannot be improved. On the other hand, with the inventor's proposals, it is possible to achieve a sufficient recovery rate with one or two cycles. Therefore, it is possible to reduce the apparatus size and power consumption of the blower and attain energy savings.

In the gas exhaust zone 15, warm water is introduced into the honeycomb. After the warm water replaces and evacuates the material gas contained in the honeycomb air gap, the rotor moves to the desorption zone 14. Therefore, it is prevented that the concentration of the recovered carbon dioxide gas is reduced by mixing material gas into the desorption zone 14. As a result, high concentration carbon dioxide can be obtained.

In the desorption zone 14, warm water is further introduced into the honeycomb, and the honeycomb is heated. It is the same as in the embodiment 1 that carbon dioxide sorbed in the solid amine of the honeycomb is desorbed and recovered. After the desorbed honeycomb moves to the liquid drainage zone 16, it discharges the warm water contained in the honeycomb space, and the honeycomb moves to the sorption zone 13 again. As described above, in this embodiment, carbon dioxide gas can be consolidated continuously by sorption.

According to the present embodiment, as described above, compared to the first embodiment, it is possible to prevent the material gas from being brought into the desorption zone 14 and avoid a reduction in the concentration of the recovered carbon dioxide gas. At the same time, it is possible to prevent the high concentration carbon dioxide gas from being carried away from the zone 14 to the sorption zone 13. This simultaneously achieves the object of improving the recovery concentration and improving the recovery rate.

In the related art, an amine liquid has a high temperature after carrying out heating desorption of the carbon dioxide gas and the amine liquid before desorption are heat-exchanged and are supplied to an absorption process. In the proposed method, since the warm water is used for desorption, and this warm water is again returned to a heating coil and then re-used, an expensive heat exchanger is not necessary and there is no thermal waste.

Figure 4:
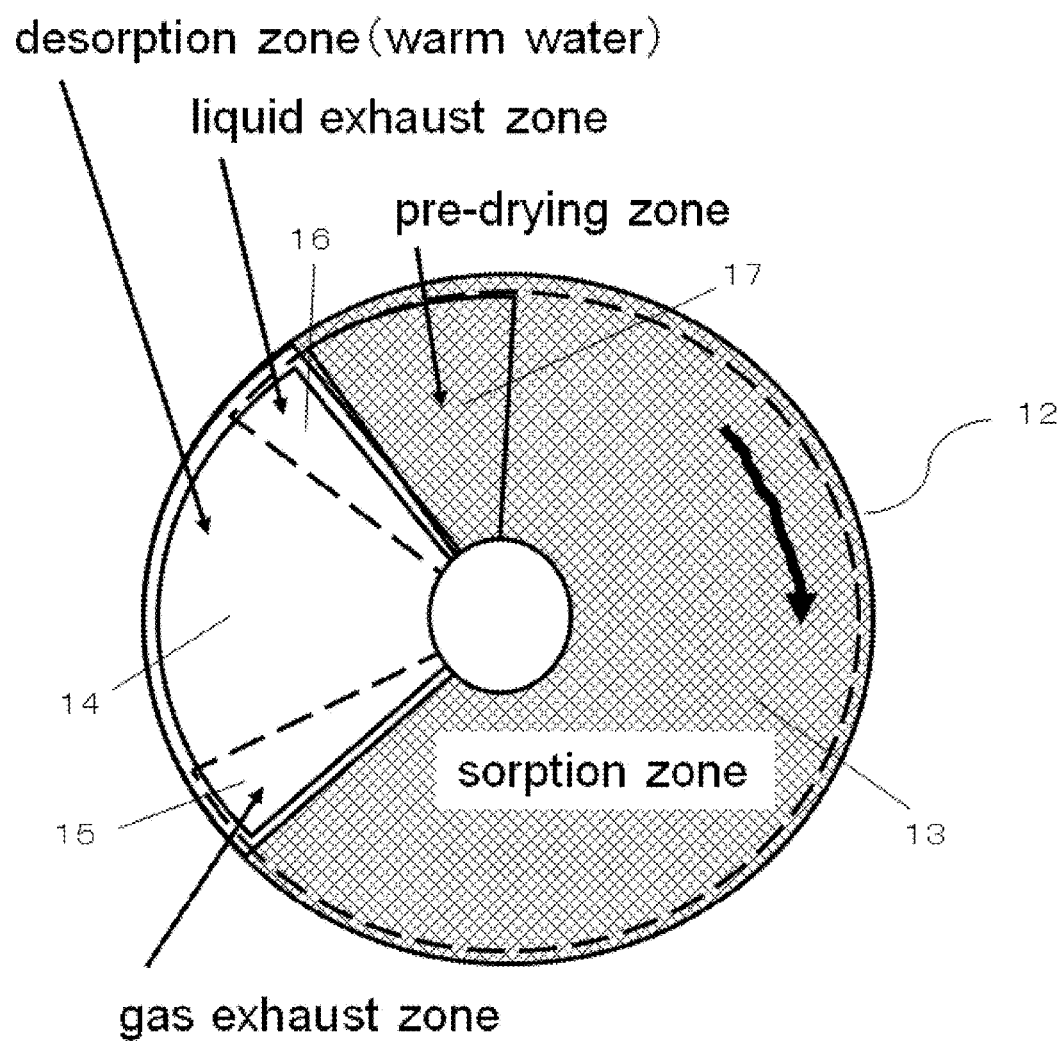
FIG. 4 shows zone division of a third preferred embodiment of the proposed carbon dioxide recovery concentration apparatus.

A third embodiment of the inventor's proposals is shown in FIG. 4. The carbon dioxide recovery concentration apparatus rotates in the rotating direction of the honeycomb rotor 12 to return to sorption zone 13 after rotating through sorption zone 13, gas discharge zone 15, desorption zone 14, and liquid discharge zone 16. The structure of the embodiment 3 is the same as other embodiments. However, pre dry zone 17 is provided between the liquid discharge zone 16 and the sorption zone 13. The honeycomb which came out of liquid discharge zone 16 is wet with water, and water evaporates according to an evaporative cooling phenomenon by passage of material gas. If a water film exists on the surface and in fine pores of the solid amine, the sorption of carbon dioxide is hindered. This embodiment is constituted so that the honeycomb moves to sorption zone 13 after carrying out pre drying until the water film decreases in pre dry zone 17. When material gas is used as pre dry gas, by returning of outlet gas in the pre dry zone 17 to a previous process, a carbon dioxide recovery rate can be increased. It is possible only in the pre dry zone to use outside air, and the air at the pre dry exit can be discharged as open air in that case. The honeycomb rotor 12 may be any one of the embodiment 1 or 2, or may be a cylindrical container rotor in which granular carbon dioxide sorbent material is divided into bucket-like containers and accommodated.

Figure 5:
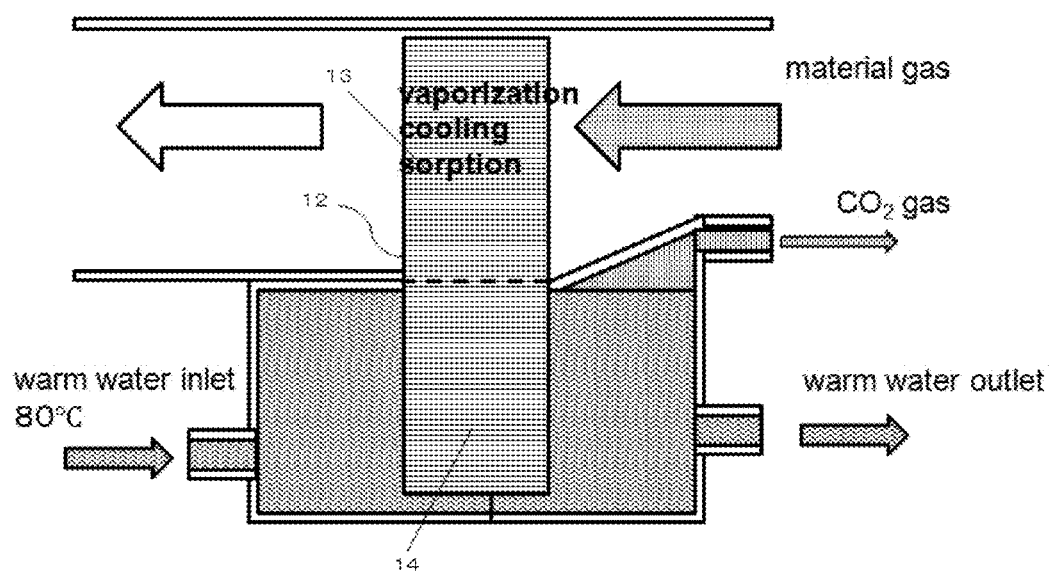
FIG. 5 shows a flow diagram of a fourth preferred embodiment of the proposed carbon dioxide recovery concentration apparatus.

A fourth preferred embodiment of the inventor's proposals is shown in FIG. 5. Carbon dioxide gas is desorbed by introducing warm water into the honeycomb and heating the honeycomb in desorption zone 14. As for warm water, since a carbon dioxide gas bubble makes it easy to desorb from a honeycomb, passing from the lower part of a honeycomb to the upper part is the preferable method. This recovers the high concentration carbon dioxide gas desorbed from the honeycomb.

In the above Preferred Embodiments 1-4, the proposals are explained by with reference to carbon dioxide gas which is an acidic gas. However, the proposals are not limited to carbon dioxide gas, and can be applied to other acidic gases or an alkaline gas, etc. by changing suitably the sorption agent carried on a sorption honeycomb rotor.

The proposed carbon dioxide capture and concentration apparatus can simultaneously increase the recovery concentration and recovery rate and can effectively concentrate carbon dioxide with lower energy consumption by utilizing low temperature waste heat. Therefore, the proposals can be applied to concentrating and removing carbon dioxide from exhaust gas such as that from a power plant.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for recovering a gas, comprising:
   contacting a water-insoluble carbon dioxide sorbing material having an acidic gas sorption capacity with a mixed gas containing carbon dioxide in a wet state to sorb carbon dioxide while vaporizing water and cooling the mixed gas and to produce a sorbing material sorbed with carbon dioxide;
   bringing warm water into contact with the sorbing material sorbed with carbon dioxide to desorb concentrated carbon dioxide and to produce a sorbing material desorbed from carbon dioxide;
   separating the warm water from the water-insoluble carbon dioxide sorbent material desorbed from carbon dioxide; and
   after separating the warm water, again contacting the water-insoluble carbon dioxide sorbing material with the mixed gas.

2. A method for recovering a gas according to claim 1, wherein the water-insoluble carbon dioxide sorbing material is a non-water soluble material which supports an amine absorbent.

3. A method for recovering a gas according to claim 1, wherein
   the water-insoluble carbon dioxide sorbing material is provided in a rotatable rotor,
   the rotor has a sorption zone to sorb carbon dioxide, a gas discharge zone, a warm water desorption zone to desorb carbon dioxide, and a liquid discharge zone, and
   the rotor is configured to return to said sorption zone again after rotating through said sorption zone, said gas discharge zone, said warm water desorption zone, and said liquid discharge zone.

4. A gas recovery concentration apparatus comprising:
   a rotatable rotor including a water-insoluble sorbent material having an acidic gas sorption capability, said rotor having a sorption zone, a gas discharge zone, a warm water desorption zone and a liquid discharge zone provided in order along a direction of rotation of the rotor, such that when rotating, the rotor rotates in order from said sorption zone to said gas discharge zone, to said warm water desorption zone, to said liquid discharge zone and back to the sorption zone;
   a gas introduction part to flow material gas containing an acidic gas through the sorption zone to sorb the acidic gas while allowing vaporization of water from the sorption zone;
   a water introduction part to flow warm water through the desorption zone to remove concentrated acidic gas from the rotor.

5. A gas recovery concentration apparatus according to claim 4, wherein said rotor further has a pre dry zone provided between the liquid discharge zone and the sorption zone such that when rotating, the rotor rotates in order from said sorption zone to said gas discharge zone, to said warm water desorption zone, to said liquid discharge zone, to the pre dry zone and back to the sorption zone.

6. A gas recovery concentration apparatus according to claim 4, further comprising:
   a re-heat heater to reheat the warm water used for desorption of carbon dioxide, to reduce a solubility of carbon dioxide which is dissolved in the warm water and to emit carbon dioxide for recovery, which is merged with other carbon dioxide gas already recovered.

7. A gas recovery concentration apparatus according to claim 4, wherein
   the rotor is a honeycomb rotor having a substrate formed of a porous paper containing plastic textiles of polyethylene terephthalate (PET) fiber with an inorganic fiber material,
   the water-insoluble sorbent material comprises solid amine fine powder, and
   the solid amine fine powder is carried by the substrate.

8. A gas recovery concentration apparatus according to 4 wherein
   said rotor is formed from a sheet material,
   the water-insoluble sorbent material comprises a granular solid amine, and
   a heat resistant and water resistant adhesive adheres the granular solid amine on front and back sides of the sheet material, and the sheet material is to form a corrugated stock, which is processed by at least one of rolling and laminating.

9. A gas recovery concentration apparatus according to claim 8, wherein
   the sheet material is formed from a metal foil or a synthetic resin.

10. A gas recovery concentration apparatus according to claim 4, wherein
    the rotor has a cylindrical shaped container in which granular carbon dioxide adsorption material is separately accommodated in a plurality of bucket-like containers.

11. A gas recovery concentration apparatus according to claim 4, wherein
    before being introduced to the sorption zone, the material gas is pretreated with a water scrubber and desulfurization equipment and then cooled to 20° C. or less, and
    the material gas is cooled with using waste heat and an absorption refrigerator or an adsorption freezer.

12. A gas recovery concentration apparatus according to claim 5, further comprising:
a re-heat heater to reheat the warm water used for desorption of carbon dioxide, to reduce a solubility of carbon dioxide which is dissolved in the warm water and to emit carbon dioxide for recovery, which is merged with other carbon dioxide gas already recovered.

13. A gas recovery concentration apparatus according to claim 5, wherein
the rotor is a honeycomb rotor having a substrate formed of a porous paper containing plastic textiles of polyethylene terephthalate (PET) fiber with an inorganic fiber material,
the water-insoluble sorbent material comprises solid amine fine powder, and
the solid amine fine powder is carried by the substrate.

14. A gas recovery concentration apparatus according to claim 5, wherein
said rotor is formed from a metallic foil or synthetic resin sheet material,
the water-insoluble sorbent material comprises a granular solid amine, and
a heat resistant and water resistant adhesive adheres the granular solid amine on front and back sides of the sheet material, and the sheet material is to form a corrugated stock, which is processed by at least one of rolling and laminating.

15. A gas recovery concentration apparatus according to claim 5, wherein
the rotor has a cylindrical shaped container in which granular carbon dioxide adsorption material is separately accommodated in a plurality of bucket-like containers.

16. A gas recovery concentration apparatus according to claim 5, wherein
before being introduced to the sorption zone, the material gas is pretreated with a water scrubber and desulfurization equipment and then cooled to 20° C. or less, and
the material gas is cooled with using waste heat and an absorption refrigerator or an adsorption freezer.

17. A method for recovering an alkaline gas, comprising:
contacting a water-insoluble alkaline gas sorbing material having an alkaline gas sorption capacity with a mixed gas containing alkaline gas in a wet state to sorb alkaline gas while vaporizing water and cooling the mixed gas and to produce a sorbing material sorbed with alkaline gas;
bringing warm water into contact with the sorbing material sorbed with alkaline gas to desorb concentrated alkaline gas and to produce a sorbing material desorbed from alkaline gas;
separating the warm water from the water-insoluble alkaline gas sorbent material desorbed from alkaline gas; and
after separating the warm water, again contacting the water-insoluble alkaline gas sorbing material with the mixed gas.

* * * * *

UNITED STATES PATENT AND TRADEMARK OFFICE
CERTIFICATE OF CORRECTION

PATENT NO. : 10,406,475 B2  
APPLICATION NO. : 15/729106  
DATED : September 10, 2019  
INVENTOR(S) : Hiroshi Okano Page 1 of 1

It is certified that error appears in the above-identified patent and that said Letters Patent is hereby corrected as shown below:

In the Claims

Column 16, Line 42, In Claim 8, after "to" insert -- claim --.

Signed and Sealed this  
Twelfth Day of November, 2019

Andrei Iancu  
*Director of the United States Patent and Trademark Office*